United States Patent
Nakata et al.

(10) Patent No.: US 10,536,646 B2
(45) Date of Patent: Jan. 14, 2020

(54) IMAGING CONTROL DEVICE AND IMAGING CONTROL METHOD

(71) Applicant: Panasonic Intellectual Property Corporation of America, Torrance, CA (US)

(72) Inventors: Yohei Nakata, Osaka (JP); Shinji Ohyama, Osaka (JP); Takuya Yamaguchi, Osaka (JP); Kazuma Takeuchi, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

(21) Appl. No.: 16/034,332

(22) Filed: Jul. 12, 2018

(65) Prior Publication Data
US 2019/0037121 A1    Jan. 31, 2019

(30) Foreign Application Priority Data

Jul. 28, 2017   (JP) .................................. 2017-145999
Mar. 9, 2018   (JP) .................................. 2018-043119

(51) Int. Cl.
*H04N 5/235*     (2006.01)
*G06K 9/00*      (2006.01)
(Continued)

(52) U.S. Cl.
CPC ....... *H04N 5/2353* (2013.01); *G06K 9/00791* (2013.01); *G06K 9/20* (2013.01);
(Continued)

(58) Field of Classification Search
CPC ............... H04N 5/2353; H04N 5/2352; H04N 5/23264; G06K 9/00791; G06T 2207/30252
See application file for complete search history.

(56) References Cited

U.S. PATENT DOCUMENTS 5,502,537 A * 3/1996 Utagawa ................. G02B 7/36
                                                    396/95
6,292,215 B1 * 9/2001 Vincent ................. G01C 11/02
                                                    348/169
(Continued)

FOREIGN PATENT DOCUMENTS

JP    2013-254474    12/2013
JP    2017-102007     6/2017

OTHER PUBLICATIONS

The Extended European Search Report dated Dec. 19, 2018 for European Patent Application No. 18185374.8.
(Continued)

*Primary Examiner* — Jamie J Atala
*Assistant Examiner* — Michael Robert Cammarata
(74) *Attorney, Agent, or Firm* — Greenblum & Bernstein, P.L.C.

(57) ABSTRACT

An imaging control device includes: a first location estimator that estimates a future location of a vehicle using an advancing direction, velocity vector, or route data of the vehicle; a surface estimator that estimates a rate of change in the road surface height in the advancing direction or the road surface state at the future location, using surface information for estimating the road surface shape or state at the future location, detected by a sensor, or an image of the road surface at the future location, captured by an imaging device; a modifier that modifies a parameter of the imaging device according to the rate of change in the road surface height in the advancing direction or the road surface state; and a controller that causes the imaging device of the vehicle to perform imaging using the modified parameter, at a timing at which the vehicle passes the future location.

9 Claims, 12 Drawing Sheets

(51) Int. Cl.
*G06T 7/20* (2017.01)
*H04N 5/232* (2006.01)
*G06K 9/20* (2006.01)

(52) U.S. Cl.
CPC ........... *G06T 7/20* (2013.01); *H04N 5/23264* (2013.01); *G06T 2207/30252* (2013.01)

(56) References Cited

U.S. PATENT DOCUMENTS

| | | | | |
|---|---|---|---|---|
| 6,603,508 | B1* | 8/2003 | Hata | H04N 5/23248 348/208.12 |
| 8,045,009 | B2* | 10/2011 | Stavely | G03B 39/00 348/208.12 |
| 2004/0227814 | A1* | 11/2004 | Choi | B60R 1/00 348/148 |
| 2004/0239771 | A1* | 12/2004 | Habe | H04N 5/23248 348/208.12 |
| 2005/0248660 | A1 | 11/2005 | Stavely et al. | |
| 2012/0229651 | A1* | 9/2012 | Takizawa | H04N 5/23219 348/169 |
| 2014/0204267 | A1* | 7/2014 | Akiba | H04N 5/2353 348/362 |
| 2016/0330374 | A1* | 11/2016 | Ilic | H04N 5/23251 |
| 2017/0118400 | A1* | 4/2017 | Hesch | H04N 5/23216 |
| 2018/0054559 | A1* | 2/2018 | Welker | G06K 9/00671 |
| 2018/0205863 | A1* | 7/2018 | Soga | H04N 5/2353 |
| 2019/0110039 | A1* | 4/2019 | Linde | H04N 13/25 |
| 2019/0208111 | A1* | 7/2019 | Wendel | H04N 5/23218 |

OTHER PUBLICATIONS

Frank Y. Shih et al: "A New Image Stabilization Model for Vehicle Navigation", Positioning, vol. 01, No. 01, Nov. 30, 2010 (Nov. 30, 2010), pp. 8-17, XP055530395.

Ramesh Raskar et al: "Coded Exposure Photography", International Conference on Computer Graphics and Interactive Techniques, ACM SIGGRAPH 2006 Papers, Boston, Massachusetts, ACM, New York, NY, USA, Jul. 1, 2006 (Jul. 1, 2006), pp. 795-804, XP058326261.

* cited by examiner

IMAGING CONTROL DEVICE AND IMAGING CONTROL METHOD

BACKGROUND

1. Technical Field

The present disclosure relates to an imaging control device and an imaging control method that control an imaging device arranged in a vehicle.

2. Description of the Related Art

Japanese Unexamined Patent Application Publication No. 2017-102007 discloses a notification processing device in which the region in front of a vehicle is captured by an imaging device and a specific marking is recognized from the captured image thereby acquired, as is conventional. As in Japanese Unexamined Patent Application Publication No. 2017-102007, using an image obtained by capturing the periphery of a vehicle, to recognize an object on a road surface for the automatic driving of the vehicle or automatic driving assistance therefor is known.

SUMMARY

In one general aspect, the techniques disclosed here feature an imaging control device that causes an imaging device arranged in a vehicle to capture the periphery of the vehicle, the imaging control device being provided with: a first location estimation unit that acquires a velocity vector indicating the advancing direction of the vehicle and the speed of the vehicle traveling in the advancing direction or route data indicating a route to be traveled by the vehicle, and estimates a future travel location of the vehicle using the velocity vector or the route data acquired; a road surface estimation unit that acquires road surface information for estimating the shape of a road surface or the state of the road surface including the estimated future travel location of the vehicle detected by a sensor arranged in the vehicle, or an image including the road surface at the estimated future travel location of the vehicle captured by the imaging device, and estimates the rate of change in the height of the road surface in the advancing direction or the state of the road surface at the future travel location of the vehicle estimated by the first location estimation unit, using the road surface information or the image acquired; a modifying unit that modifies a parameter of the imaging device which is at least one of a shutter speed of the imaging device and a sensitivity of the imaging device, according to the rate of change in the height of the road surface in the advancing direction or the state of the road surface estimated by the road surface estimation unit; and a control unit that causes the imaging device to perform imaging using the parameter modified by the modifying unit, at a timing at which the vehicle passes the future travel location of the vehicle estimated by the first location estimation unit.

According to the imaging control device as in the present disclosure, an imaging device can be made to capture images in which object recognition is easy.

It should be noted that general or specific aspects hereof may be realized by a system, a method, an integrated circuit, a computer program, or a recording medium such as a computer-readable CD-ROM, and may be realized by an arbitrary combination of a system, a method, an integrated circuit, a computer program, and a recording medium. medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
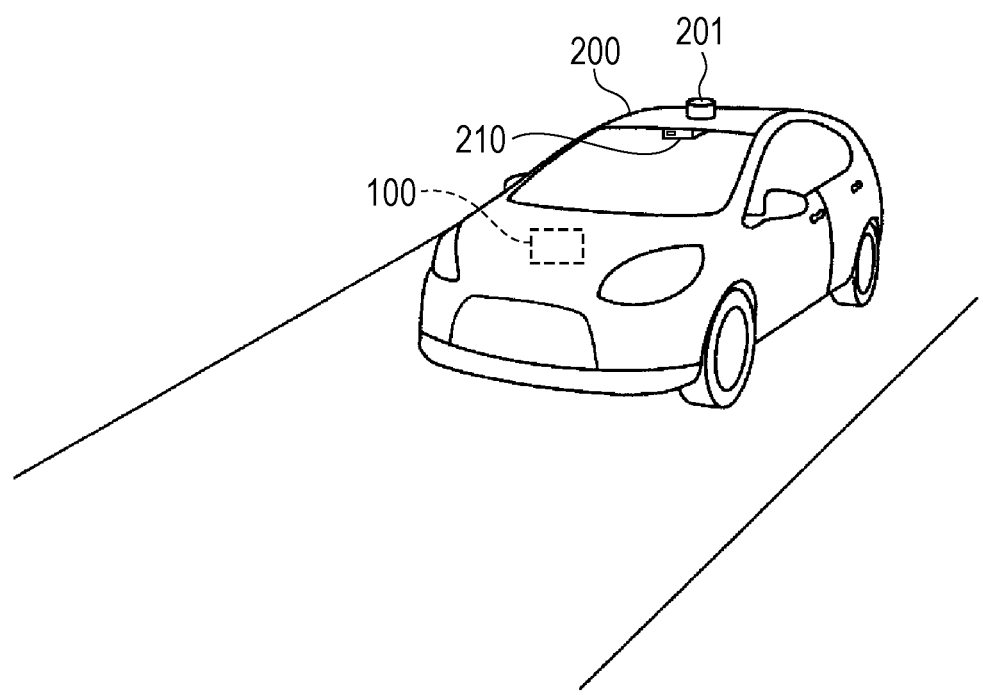
FIG. 1 is a drawing depicting an external view of a vehicle according to an embodiment.

Underlying Knowledge Forming Basis of the Present Disclosure

The inventor discovered that the following problems occur in relation to the notification processing device described in the "Description of the Related Art" section.

In the technique of Japanese Unexamined Patent Application Publication No. 2017-102007, in a case where there is a sudden change in the position of a vehicle due to the vehicle traveling on a rough road such as a gravel surface or stone paving, or a road surface that is uneven, has level differences, or the like, the position of an imaging device arranged in the vehicle also suddenly changes. Blurring, distortion, or the like therefore occurs in images obtained by the imaging device, and it is difficult to recognize objects (including people) appearing in the image.

That is, in the aforementioned prior art, it was difficult to easily recognize objects from images obtained by an imaging device arranged in a vehicle.

The present disclosure provides an imaging control device and the like with which an imaging device can be made to capture images in which object recognition is easy.

An imaging control device according to an aspect of the present disclosure is an imaging control device that causes an imaging device arranged in a vehicle to capture the periphery of the vehicle, the imaging control device being provided with: a first location estimation unit that acquires a velocity vector indicating the advancing direction of the vehicle and the speed of the vehicle traveling in the advancing direction or route data indicating a route to be traveled by the vehicle, and estimates a future travel location of the vehicle using the velocity vector or the route data acquired; a road surface estimation unit that acquires road surface information for estimating the shape of a road surface or the state of the road surface including the estimated future travel location of the vehicle detected by a sensor arranged in the vehicle, or an image including the road surface at the estimated future travel location of the vehicle captured by the imaging device, and estimates the rate of change in the height of the road surface in the advancing direction or the state of the road surface at the future travel location of the vehicle estimated by the first location estimation unit, using the road surface information or the image acquired; a modifying unit that modifies a parameter of the imaging device which is at least one of a shutter speed of the imaging device and a sensitivity of the imaging device, according to the rate of change in the height of the road surface in the advancing direction or the state of the road surface estimated by the road surface estimation unit; and a control unit that causes the imaging device to perform imaging using the parameter modified by the modifying unit, at a timing at which the vehicle passes the future travel location of the vehicle estimated by the first location estimation unit.

Accordingly, the imaging device can be made to perform imaging using a parameter that has been modified according to the shape or state of the road surface estimated in advance, at a timing at which the vehicle actually passes the road surface at the future travel location. That is, the imaging device can be made to perform imaging using a parameter that has been appropriately set according to the rate of change in the height of the road surface in the advancing direction of the vehicle or the state of the road surface, and therefore the imaging device can be made to capture images in which object recognition is easy.

Furthermore, a second location estimation unit that estimates the current location of the vehicle may be further provided, and the first location estimation unit may estimate the future travel location of the vehicle additionally using the current location of the vehicle estimated by the second location estimation unit.

The future travel location can therefore be accurately estimated.

Furthermore, the first location estimation unit may acquire the velocity vector, and the modifying unit may estimate the magnitude of the velocity at which the imaging device is moving in a direction parallel with an imaging surface of the imaging device at the timing, from the rate of change in the height of the road surface in the advancing direction estimated by the road surface estimation unit, and the velocity vector, and perform at least one of (i) modifying the shutter speed to a value that becomes smaller, and (ii) modifying the sensitivity to a value that becomes larger, as the estimated magnitude of the velocity in the parallel direction becomes larger.

Therefore, the imaging device is made to perform imaging in a state in which at least one has been performed out of modifying the shutter speed to a value that becomes smaller, and modifying the sensitivity to a value that becomes larger, as the magnitude of the velocity in the parallel direction of the imaging device becomes larger. It is thereby possible to reduce blurring, distortion, or the like occurring in an obtained image.

Furthermore, the modifying unit may decide the shutter speed in accordance with the estimated magnitude of the velocity in the parallel direction, specify a noise level and exposure with which the recognition rate in a case where an object is recognized using a predetermined recognition algorithm from an image obtained by the imaging device performing imaging at the decided shutter speed is greater than a predetermined value, and modify the parameter of the imaging device to the decided shutter speed and a sensitivity that corresponds to the specified exposure.

The imaging device can therefore be made to perform imaging using a parameter with which there is an improvement in the recognition rates of objects appearing in images. The imaging device can thereby be made to capture images in which object recognition is easy.

Furthermore, there may be further provided a blurring correction unit that acquires the image captured by the imaging device, detects blurring of an object within the image acquired, and, in a case where blurring of the object within the image is detected, causes the modifying unit to perform at least one of (i) modifying the shutter speed to a smaller value, and (ii) modifying the sensitivity to a larger value.

Therefore, the imaging device can be made to perform imaging using a parameter that has been modified in such a way that blurring does not occur when imaging is performed at the next timing, even in a case where blurring has occurred within an image captured using the parameter modified by the modifying unit.

Furthermore, there may be further provided a velocity correction unit that estimates the movement velocity of an object on the basis of a change in the location of the object, which is included in each of a plurality of images obtained by the imaging device performing imaging a plurality of times, and causes the modifying unit to perform at least one of (i) modifying the shutter speed to a value that becomes smaller, and (ii) modifying the sensitivity to a value that becomes larger, as the magnitude of the estimated movement velocity becomes larger.

The imaging device can therefore be made to perform imaging using an appropriate parameter, even in a case where the object is moving within the imaging range of the imaging device.

Furthermore, the modifying unit may acquire illuminance information indicating an illuminance that is a detection result according to an illuminance sensor that detects the illuminance of the environment in which the imaging device is arranged, and perform at least one of (i) modifying the shutter speed to a value that becomes smaller, and (ii) modifying the sensitivity to a value that becomes larger, as the illuminance indicated by the acquired illuminance information becomes smaller.

The imaging device can therefore be made to perform imaging using an appropriate parameter in accordance with the illuminance.

The road surface estimation unit may estimate the rate of change in the height of the road surface in the advancing direction at the future travel location estimated by the first location estimation unit, and the modifying unit may modify the parameter of the imaging device in accordance with the rate of change in the height of the road surface in the advancing direction at the estimated future travel location of the vehicle.

With this configuration, the parameter of the imaging device can be modified according to the rate of change in the height of the road surface in the advancing direction at the estimated future travel location of the vehicle.

It should be noted that general or specific aspects hereof may be realized by a system, a method, an integrated circuit, a computer program, or a recording medium such as a computer-readable CD-ROM, and may be realized by an arbitrary combination of a system, a method, an integrated circuit, a computer program, or a recording medium.

Hereinafter, an imaging control device and an imaging control method according to an aspect of the present disclosure will be described in detail with reference to the drawings.

It should be noted that the embodiments described hereinafter all represent a specific example of the present disclosure. The numerical values, the shapes, the materials, the constituent elements, the arrangement positions and modes of connection of the constituent elements, the steps, the order of the steps, and the like given in the following embodiments are examples and are not intended to limit the present disclosure. Furthermore, from among the constituent elements in the following embodiments, constituent elements that are not mentioned in the independent claims indicating the most significant concepts are described as optional constituent elements.

Embodiment

Hereinafter, an embodiment will be described using FIGS. 1 to 7.

1-1. CONFIGURATION

FIG. 1 is a drawing depicting an external view of a vehicle according to the embodiment.

A vehicle 200 has arranged therein an imaging device 210 that captures the region in front of the vehicle. The imaging device 210 is not restricted to capturing the region in front of the vehicle 200, and may capture the region in the left direction, the right direction, the rear direction, or the like of the vehicle 200 as long as the periphery of the vehicle 200 is captured. Images captured by the imaging device 210 are used to recognize objects in the periphery of the vehicle 200. Recognition results are used for the automatic driving of the vehicle 200 or driving assistance therefor.

A distance sensor 201 is arranged on the upper section of the vehicle 200. The distance sensor 201 detects the distances to objects in the periphery of the vehicle 200. Distance information indicating the distances detected by the distance sensor 201 is used to estimate the location of the vehicle 200 for automatic driving or automatic driving assistance, for example.

An imaging control device 100 controls imaging performed by the imaging device 210.

Next, a specific example of a hardware configuration of the vehicle 200 provided with the imaging control device 100 will be described using FIG. 2.

Figure 2:
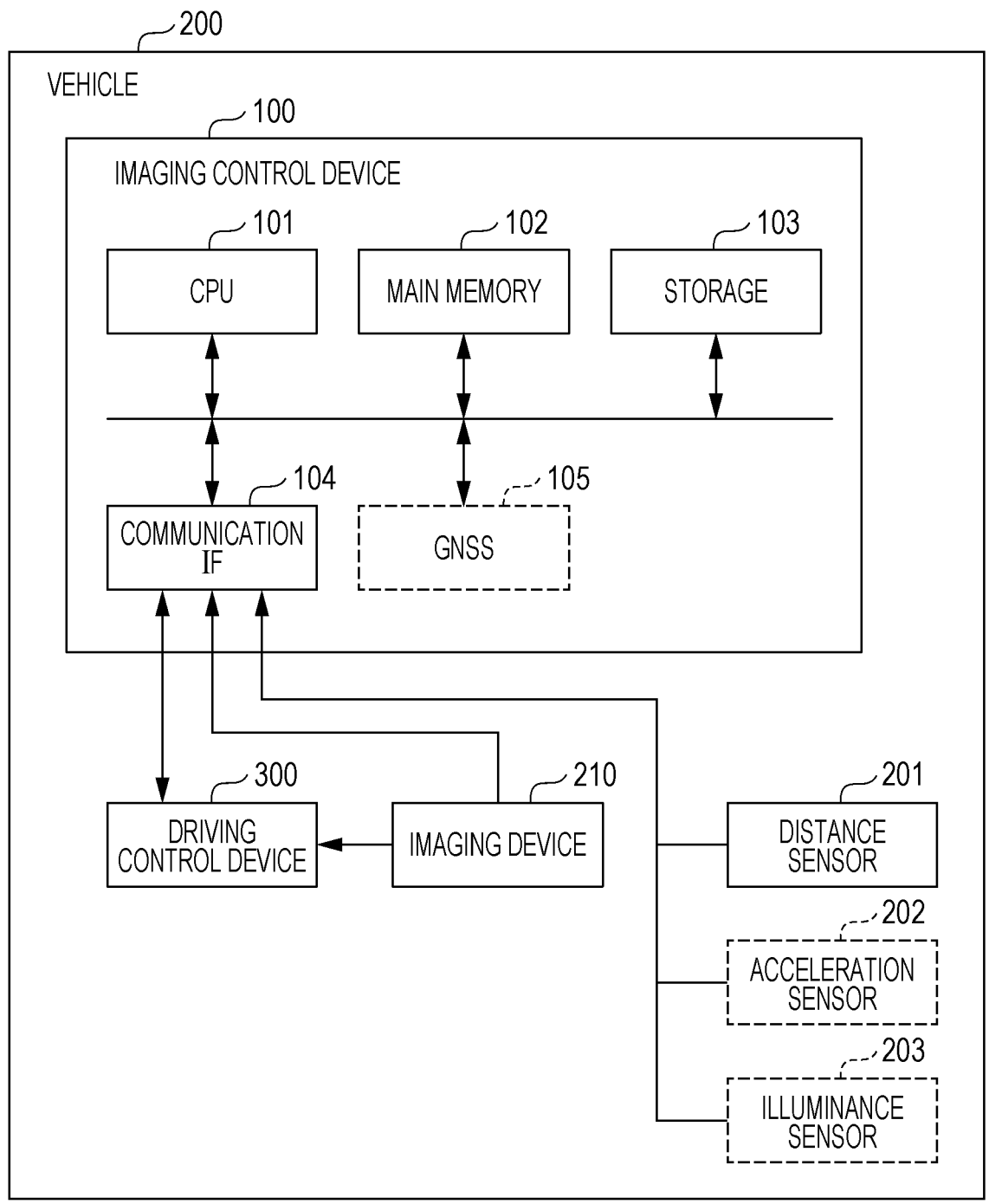
FIG. 2 is a block diagram depicting an example of a hardware configuration of the vehicle provided with an imaging control device according to the embodiment.

FIG. 2 is a block diagram depicting an example of a hardware configuration of the vehicle provided with the imaging control device according to the embodiment.

As depicted in FIG. 2, the vehicle 200 is provided with the imaging control device 100, the imaging device 210, the distance sensor 201, and a driving control device 300 as a hardware configuration. The vehicle 200 may be further provided with an acceleration sensor 202 and an illuminance sensor 203.

The imaging control device 100 is provided with a CPU (central processing unit) 101, a main memory 102, a storage 103, and a communication IF (interface) 104 as a hardware configuration. The imaging control device 100 may be provided with a GNSS (global navigation satellite system) 105. Furthermore, the imaging control device 100 may be an ECU (electronic control unit), for example.

The CPU 101 is a processor that executes a control program stored in the storage 103 or the like. For example, the CPU 101 executes the control program and thereby causes the blocks of the imaging control device 100 depicted in FIG. 3, described later on, to function.

The main memory 102 is a volatile storage area which is employed as a work area that is used when the CPU 101 executes the control program.

The storage 103 is a nonvolatile storage area that retains the control program, content, or the like.

The communication IF 104 is a communication interface that communicates with the imaging device 210 via a communication network such as a CAN (controller area network). It should be noted that the communication IF 104 is not restricted to a communication interface that employs wired communication and may be a communication interface that employs wireless communication. Furthermore, the communication IF 104 may be any kind of communication interface as long as it is possible to establish a communication connection with the imaging device 210, the driving control device 300, the various types of sensors 201 to 203, and the like. Furthermore, the communication IF 104 may be a communication interface that is capable of connecting to a general-purpose network such as the Internet or a dedicated network.

The GNSS 105 receives information indicating the location of the GNSS 105 from an artificial satellite such as a GPS satellite. That is, the GNSS 105 detects the current location of the vehicle 200.

The imaging device 210 is a camera that has an optical system such as a lens and an image sensor. The imaging device 210 is connected to the imaging control device 100 in such a way that mutual communication is possible.

The distance sensor 201 detects distances to objects in the periphery of the vehicle 200. Specifically, the distance sensor 201 detects distances to objects that are within a detection range of all directions in 360 degrees in the horizontal direction of the vehicle 200 and an angle range of a predetermined angle (30 degrees, for example) in the vertical direction. It is possible to generate a three-dimensional shape of terrain including objects in the periphery of the vehicle 200 from the distances detected by the distance sensor 201. For example, it is possible to generate a three-dimensional shape of obstacles and the road surface in the periphery of the traveling vehicle 200, as a three-dimensional shape of terrain including objects in the periphery of the vehicle 200. It should be noted that it is possible to generate three-dimensional shapes including a road surface on which the vehicle will travel in the future, if the detection range of the distance sensor 201 is a range such as the aforementioned. The distance sensor 201, for example, is a laser sensor that employs LIDAR (light detection and ranging) or the like.

The acceleration sensor 202 is a sensor that detects acceleration in each of three axial directions of the vehicle 200, for example. The acceleration sensor 202 may be a sensor that detects acceleration in each of two axes in the horizontal direction. The acceleration sensor 202 detects velocity vectors of the vehicle 200 by detecting the acceleration of the vehicle 200 in each of the three axial directions.

The illuminance sensor 203 is arranged in the space in which the imaging device 210 is arranged, and detects the illuminance of that space. The illuminance sensor 203 may be arranged inside the vehicle 200, for example.

The driving control device 300 is an information processing device that controls the driving of the vehicle 200. The driving control device 300, for example, has a CPU, a main memory, a storage, a communication IF, or the like. The driving control device 300 may be realized by means of a configuration that is common to the imaging control device 100. That is, the driving control device 300 may be realized by the CPU 101, the main memory 102, the storage 103, and the communication IF 104. Furthermore, the driving control device 300 may be realized by an ECU, may be realized by an ECU that realizes the imaging control device 100 in a case where the imaging control device 100 is realized by an ECU, or may be realized by an ECU that is different from the ECU that realizes the imaging control device 100, for example.

Next, a functional configuration of the vehicle provided with the imaging control device will be described using FIG. 3.

Figure 3:
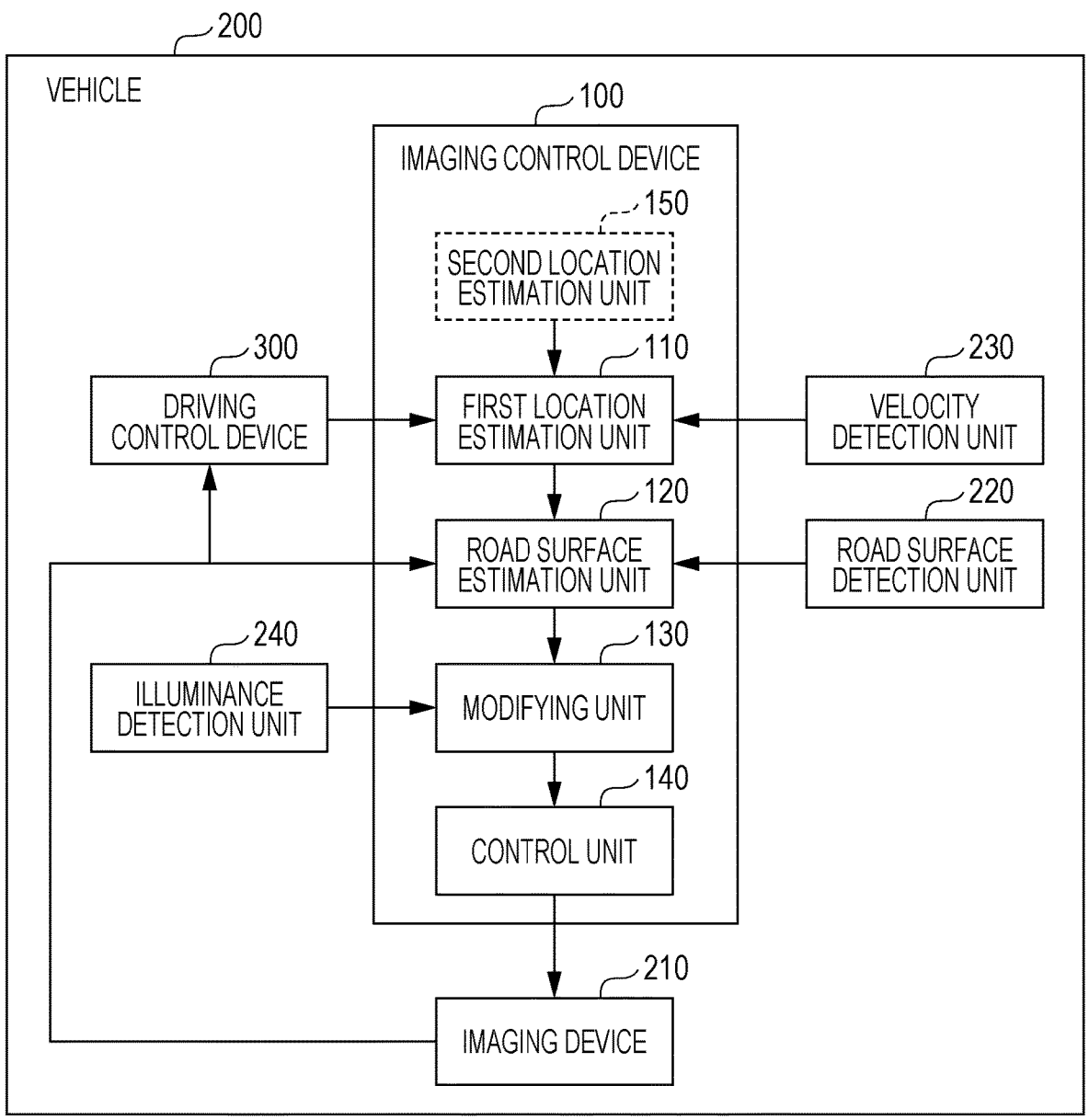
FIG. 3 is a block diagram depicting an example of a functional configuration of the vehicle provided with the imaging control device according to the embodiment.

FIG. 3 is a block diagram depicting an example of a functional configuration of the vehicle provided with the imaging control device according to the embodiment.

The vehicle 200 is provided with the imaging control device 100, the imaging device 210, a road surface detection unit 220, a velocity detection unit 230, an illuminance detection unit 240, and the driving control device 300 as a functional configuration.

The imaging device 210 captures the periphery of the vehicle 200, and thereby generates an image of the periphery of the vehicle 200. The imaging device 210 captures the periphery of the vehicle 200 at a plurality of different timings. The imaging device 210 captures the periphery of the vehicle 200 at a predetermined sampling cycle such as ¹⁄₃₀ seconds or ¹⁄₂₀ seconds, for example. Similar to the detection range of the distance sensor 201, the imaging range of the imaging device 210 may be all directions in 360 degrees in the horizontal direction of the vehicle 200 and an angle range of a predetermined angle (30 degrees, for example) in the vertical direction, for example. It should be noted that it is possible to generate three-dimensional shapes including a road surface on which the vehicle will travel in the future, if the imaging range of the imaging device 210 is a range such as the aforementioned.

It should be noted that the sampling cycle of the imaging device 210 is not restricted to ¹⁄₃₀ seconds or ¹⁄₂₀ seconds. Furthermore, the imaging device 210 may not perform imaging at a predetermined sampling cycle, may perform imaging at random time intervals, or may adjust the timing at which imaging is performed according to the situation.

The road surface detection unit 220 detects road surface information for estimating the shape of a road surface or the state of the road surface for the vehicle 200. The road surface detection unit 220 detects the distance from the vehicle 200 to an object in the periphery of the vehicle 200, for example. Furthermore, the road surface detection unit 220 may detect the reflectance of a laser in the road surface in the periphery of the vehicle 200, for example. The road surface detection unit 220 is realized by a sensor, more specifically, the distance sensor 201, for example. For example, information regarding the distance to the road surface in the periphery of the vehicle 200 detected by the distance sensor 201 corresponds to road surface information for estimating the shape of the road surface for the vehicle 200, and the reflectance of a laser in the road surface in the periphery of the vehicle 200 corresponds to road surface information for estimating the state of the road surface.

The velocity detection unit 230 detects a velocity vector of the vehicle 200. A velocity vector of the vehicle 200 is information indicating the advancing direction of the vehicle 200 and the speed of the vehicle 200 advancing in this advancing direction, for example. A velocity vector is also referred to as movement velocity. That is, the velocity detection unit 230 detects the advancing direction of the vehicle 200 and the magnitude of the movement velocity in the advancing direction. The velocity detection unit 230 is realized by the acceleration sensor 202, for example.

The illuminance detection unit 240 detects the illuminance of the space in which the imaging device 210 is arranged. The illuminance detection unit 240 detects the illuminance inside the vehicle 200, for example. The illuminance detection unit 240 is realized by the illuminance sensor 203, for example.

The driving control device 300 controls the driving of the vehicle 200. Specifically, the driving control device 300 performs automatic driving or driving assistance for the vehicle 200 by controlling the steering which steers the wheels, the engine which drives the rotation of the wheels, a motive power source such as a motor, brakes that brake the wheels, or the like. The driving control device 300 decides a global route indicating which roads the vehicle 200 is to travel along, using the current location of the vehicle 200, the destination of the vehicle 200, and peripheral road information, for example. Also, the driving control device 300 generates local route data indicating a local route along which the vehicle 200 is to travel, on the decided global route. Furthermore, while traveling, the driving control device 300 detects obstacles in the advancing direction of the vehicle 200 using at least one of an image captured by the imaging device 210 and the distance to an object detected by the distance sensor 201. Thus, the driving control device 300, if having detected an obstacle, generates local route data indicating a local route that avoids the obstacle in the decided global route. Furthermore, the driving control device 300 controls the steering, the motive power source, and the brakes in such a way as to travel along the route indicated by the generated route data. The driving control device 300 may output the generated route data, obstacle information indicating obstacle detection results, or the like to the imaging control device 100.

The imaging control device 100 is provided with a first location estimation unit 110, a road surface estimation unit 120, a modifying unit 130, and a control unit 140 as a functional configuration. The imaging control device 100 may be further provided with a second location estimation unit 150. Furthermore, the imaging control device 100 may be additionally provided with a velocity correction unit (not depicted). Furthermore, the imaging control device 100 may be additionally provided with a blurring correction unit (not depicted).

The second location estimation unit 150 estimates the current location of the vehicle 200. The second location estimation unit 150 may estimate the current location of the vehicle 200 using information received by the GNSS 105, for example. In this case, the second location estimation unit 150 is realized by the CPU 101, the main memory 102, the storage 103, and the GNSS 105, for example.

Furthermore, the second location estimation unit 150 may estimate the current location of the vehicle 200 using a history of steering angles and wheel speeds of the vehicle 200. In this case, the second location estimation unit 150 is realized by the CPU 101, the main memory 102, the storage 103, and the communication IF 104, for example. The history of steering angles and wheel speeds of the vehicle 200 may be periodically stored by the storage 103 via the communication IF 104. Furthermore, the history of steering angles and wheel speeds of the vehicle 200 may be acquired via the communication IF 104 from another storage that stores a history of fluctuations in the steering and a history of fluctuations in the wheel speeds of the vehicle 200.

Furthermore, the second location estimation unit 150 may estimate the current location of the vehicle 200 using a history of the acceleration of the vehicle 200. In this case, the second location estimation unit 150 is realized by the CPU 101, the main memory 102, the storage 103, and the communication IF 104, for example. The history of the acceleration may be periodically stored by the storage 103 via the communication IF 104. Furthermore, the history of the acceleration of the vehicle 200 may be acquired via the communication IF 104 from another storage that stores detection results of the acceleration sensor arranged in the vehicle 200.

Furthermore, the second location estimation unit 150 may estimate the current location of the vehicle 200 by matching a three-dimensional shape of terrain in the periphery of the vehicle 200 generated from distances detected by the distance sensor 201, and a three-dimensional shape of terrain that has been acquired in advance. In this case, the second location estimation unit 150 is realized by the CPU 101, the main memory 102, the storage 103, and the communication IF 104, for example. Distance information indicating distances detected by the distance sensor 201 may be acquired via the communication IF 104.

The first location estimation unit 110 acquires the velocity vector or route data of the vehicle 200, and estimates a future travel location of the vehicle 200 using the acquired velocity vector or route data. The first location estimation unit 110 may acquire the velocity vector from the velocity detection unit 230. It should be noted that the first location estimation unit 110 may acquire the velocity vector from the advancing direction and speed of the vehicle 200 calculated from the temporal transition in the current location of the vehicle 200 estimated by the second location estimation unit 150. The first location estimation unit 110 may acquire route data from the driving control device 300. The first location estimation unit 110 is realized by the CPU 101, the main memory 102, the storage 103, and the communication IF 104, for example.

The first location estimation unit 110 may estimate a location separated by a predetermined distance from the vehicle 200 on a route specified from the route data of the vehicle 200, as an estimated future travel location of the vehicle 200. It should be noted that the predetermined distance may be a distance that is equal to or less than the maximum distance that can be detected by the distance sensor 201. Furthermore, the predetermined distance may be a distance that is greater than the distance advanced by the vehicle 200 during a predetermined sampling cycle of the imaging device 210 (that is, the time from the imaging device 210 capturing one image to capturing the next image). In this case, the velocity of the vehicle 200 may be fixed at a predetermined velocity (for example, 50 km/h, 100 km/h, or the like).

Furthermore, the first location estimation unit 110 may estimate a location where the vehicle 200 passes after a predetermined time, as a future travel location of the vehicle 200. In this case, the first location estimation unit 110 may estimate a location that the vehicle 200 reaches when having advanced for a predetermined time at the current velocity in the current advancing direction after a predetermined time, from the velocity vector of the vehicle 200, as a future travel location.

In a case where the current location of the vehicle 200 has been estimated by the second location estimation unit 150, the first location estimation unit 110 may estimate a future travel location of the vehicle 200 additionally using the current location of the vehicle 200 estimated by the second location estimation unit 150.

The road surface estimation unit 120 acquires distance information detected by the distance sensor 201 arranged in the vehicle 200, or an image captured by the imaging device 210, and estimates the shape of the road surface or the state of the road surface at the future travel location of the vehicle 200 estimated by the first location estimation unit 110, using the acquired distance information or image. Specifically, the road surface estimation unit 120 may generate a three-dimensional shape of terrain including objects in the periphery of the vehicle 200 generated from distance information detected by the distance sensor 201 corresponding to the road surface detection unit 220, and may estimate the shape of the road surface at the future travel location of the vehicle 200 using the generated three-dimensional shape.

For example, the road surface estimation unit 120 generates a three-dimensional shape of terrain including objects in the periphery of the vehicle 200 from distance information generated by the distance sensor 201. Furthermore, the road surface is positioned at the lower side in the detection range of the distance sensor 201 in the vertical direction in particular, and therefore a three-dimensional shape that is generated from the distance to an object detected from a fixed range including the boundary at the lower side of the detection range of the distance sensor 201 may serve as a three-dimensional shape of the road surface, for example. Alternatively, the periphery of the vehicle 200 may be captured using the imaging device 210 together with the detection performed by the distance sensor 201. In this case, the road surface estimation unit 120 may specify a road surface included in a captured image using an image recognition technique, for example, and the three-dimensional shape of a portion corresponding to the specified road surface within a generated three-dimensional shape may serve as the three-dimensional shape of the road surface.

Furthermore, the road surface estimation unit 120 may generate a three-dimensional shape of terrain including objects in the periphery of the vehicle 200 using an image recognition technique, for example, from an image obtained in the predetermined sampling cycle by the imaging device 210. The road surface is included in the imaging range of the imaging device 210, and therefore a captured image includes an image of the road surface. Consequently, a three-dimensional shape of the road surface is included in a three-dimensional shape generated from an image. The road surface estimation unit 120 may specify the road surface included in the image. The road surface estimation unit 120 may specify the three-dimensional shape of a portion corresponding to the specified road surface from within a generated three-dimensional shape as the three-dimensional shape of the road surface.

The road surface estimation unit 120 may estimate the shape of the road surface at a future travel location of the vehicle 200 using a generated three-dimensional shape.

The shape of the road surface at the future travel location of the vehicle 200 mentioned here may include a shape change rate that indicates a percentage by which the height of the vehicle 200 changes in a case where the vehicle 200 has traveled on the road surface in the advancing direction. That is, the shape of the road surface at the future travel location of the vehicle 200 includes a rate of change in the height of the road surface in the advancing direction. The height of the road surface is the position of the road surface in the vertical direction.

Furthermore, the road surface estimation unit 120 may estimate the state of the road surface using the reflectance of a laser detected by the distance sensor 201. The reflectance of a laser is an example of road surface information that is used to estimate the state of the road surface. Furthermore, the road surface estimation unit 120 may estimate the state of the road surface from the luminance of an image using an image of the road surface obtained by the imaging device 210. The state of the road surface mentioned here includes a gravel surface, a sand surface, a frozen surface, a wet surface, stone paving, and the like. By estimating the state of the road surface, it is possible to estimate the slipperiness of the road surface, represented by the coefficient of friction or the like of the road surface. The road surface estimation unit 120 is realized by the CPU 101, the main memory 102, the storage 103, and the communication IF 104, for example.

The modifying unit 130 modifies a parameter of the imaging device 210, which is at least one of the shutter speed of the imaging device 210 and the sensitivity of the imaging device 210, in accordance with the shape of the road surface or the state of the road surface estimated by the road surface estimation unit 120. Specifically, the modifying unit 130 estimates the magnitude of the velocity at which the imaging device 210 is moving in a direction parallel with the imaging surface of the imaging device 210, at a timing at which the vehicle 200 passes the estimated future travel location, from the shape of the road surface estimated by the road surface estimation unit 120 and the velocity of the vehicle 200 detected by the velocity detection unit 230. The modifying unit 130 then performs at least one of modifying the shutter speed to a value that becomes smaller, and modifying the sensitivity to a value that becomes larger, as the estimated magnitude of the velocity in the direction parallel with the imaging surface of the imaging device 210 becomes larger. The modifying unit 130 is realized by the CPU 101, the main memory 102, and the storage 103, for example.

The modifying unit 130, for example, may calculate the amount of blurring in an image obtained by the imaging device 210 using expression 1 below, and modify the shutter speed to a small value in order to reduce the calculated amount of blur to be less than a predetermined amount of blurring.

Amount of blurring(pixel/shutter)=(arctan((shape change rate/host vehicle velocity)/wheelbase)*shutter speed)/vertical viewing angle*vertical resolution     (expression 1)

The wheelbase of the vehicle 200 is taken as 2000 mm, the traveling velocity of the vehicle 200 is taken as 30 km/h, the shape change rate of the road surface at the estimated future travel location is taken as 100%, the shutter speed is taken as 1/100 seconds, the vertical viewing angle of the imaging device 210 is taken as 60 degrees, and the vertical resolution of the imaging device 210 is taken as 1080 px, for example. In this case, by using expression 1, the amount of blurring can be calculated as being 13.77 px/shutter. That is, it is understood that it is necessary for the shutter speed to be set to be 1/138 seconds or less if the amount of blurring is to be suppressed to 10 pix/shutter or less. It should be noted that the velocity of the imaging device 210 corresponds to a velocity obtained using the traveling velocity of the vehicle 200 and the shape change rate of the road surface.

Furthermore, on the right side of expression 1, a predetermined coefficient may be multiplied, a coefficient may be added, or a combination thereof may be implemented in accordance with each road surface state (gravel surface, sand surface, frozen surface, wet surface, stone paving, and the like).

Thus, the required shutter speed can be calculated using expression 1.

It should be noted that the modifying unit 130 may not calculate the shutter speed using the aforementioned expression 1, and may calculate the shutter speed using a table that satisfies the relationship of the aforementioned expression 1. That is, the modifying unit 130 may calculate the shutter speed using the relationship between predetermined shutter speeds, the shape change rate of the road surface, and the velocity of the vehicle 200.

That is, the modifying unit 130 decides a shutter speed with which the amount of blurring is less than a predetermined amount of blurring, in accordance with the estimated velocity of the imaging device 210. The modifying unit 130 then specifies a noise level and exposure with which there is an increase in the recognition rate in a case where an object is recognized using a predetermined recognition algorithm from an image obtained by the imaging device 210 performing imaging at the decided shutter speed. The modifying unit 130 modifies the parameters of the imaging device 210 to the decided shutter speed and a sensitivity corresponding to the specified exposure.

Figure 4:
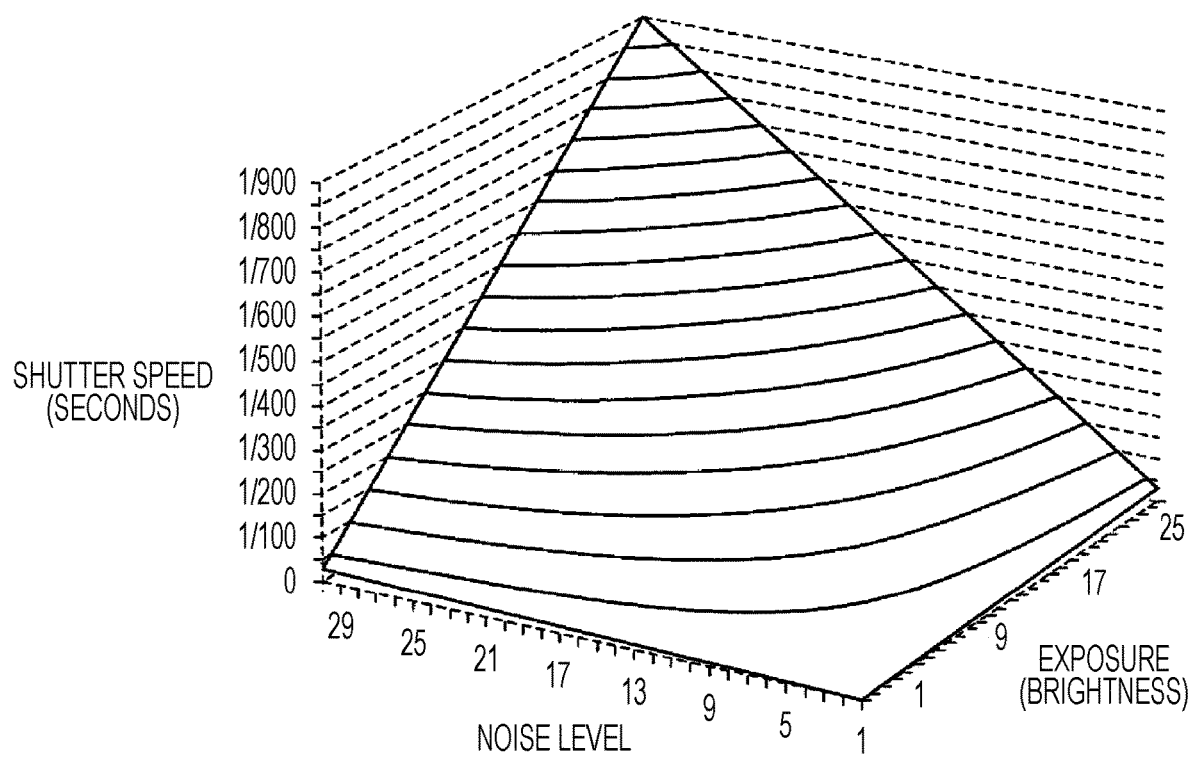
FIG. 4 is an image diagram depicting combinations of noise levels and exposures with which each of a plurality of different shutter speeds can be realized.
Figure 5:
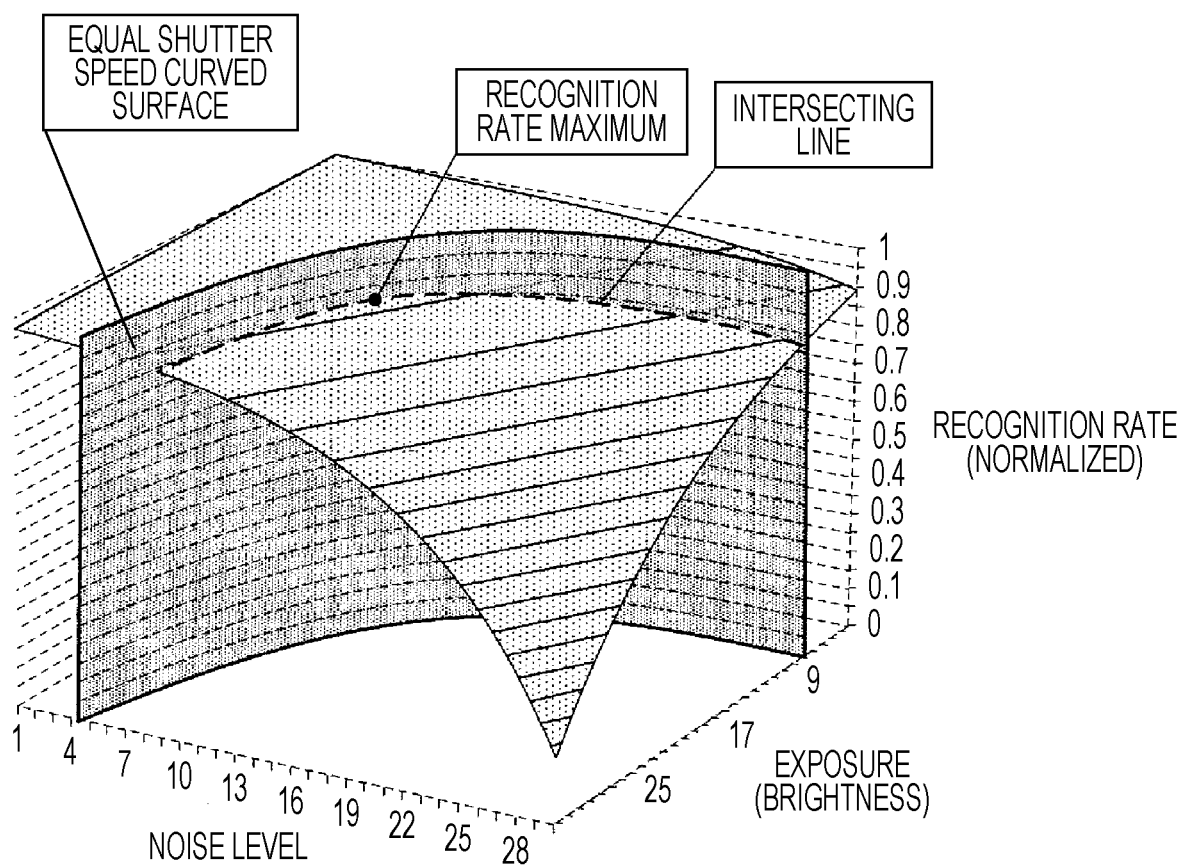
FIG. 5 is an image diagram depicting recognition rates in a case where an image is recognized using a predetermined recognition algorithm, and combinations of noise levels and exposures.

FIG. 4 is an image diagram depicting combinations of noise levels and exposures with which each of a plurality of different shutter speeds can be realized. FIG. 5 is an image diagram depicting recognition rates in a case where an image is recognized using a predetermined recognition algorithm, and combinations of noise levels and exposures. It should be noted that the numerical values for the noise levels and exposures in FIGS. 4 and 5 indicate arbitrary magnitudes.

FIG. 4 depicts curved lines, which indicate relationships between noise levels and exposures for realizing arbitrary shutter speeds, being uniquely specified. That is, FIG. 4 depicts a three-dimensional curved surface according to the three types of variables of shutter speed, noise level, and exposure. It should be noted that the three-dimensional curved surface depicted in FIG. 4 can be uniquely obtained according to the imaging capability of the imaging device 210. The imaging capability mentioned here is uniquely determined according to the focal length, f value, or the like of the imaging device 210, or the imaging element size, sensitivity, or the like of the image sensor. The three-dimensional curved surface depicted in FIG. 4 may be decided in advance by performing a predetermined calibration on the imaging device 210.

FIG. 5 depicts a three-dimensional curved surface according to the three types of variables of noise level, exposure, and recognition rate. This curved surface is depicted in FIG. 5 by hatching in which dots are sparse. The three-dimensional curved surface depicted in FIG. 5 is uniquely determined according to a predetermined recognition algorithm. The three-dimensional curved surface depicted in FIG. 5 may be decided in advance by repeating a test in which an object is recognized from an image a plurality of times.

Here, the modifying unit 130, for example, when having decided the shutter speed as being ½50 seconds in accordance with the aforementioned expression 1, specifies a curved line indicating the relationship between a noise level and exposure corresponding to the shutter speed of ½50 seconds, using the relationships depicted in FIG. 4. The modifying unit 130 then obtains a line that intersects the curved surface in which dots are sparse, by arranging a curved surface in which the recognition rate is 0 to 1 (the curved surface depicted by the hatching in which dots are dense in FIG. 5) in the three-dimensional space depicted in FIG. 5, using the curved line indicating the relationship between the noise level and exposure corresponding to the shutter speed of ½50 seconds. This intersecting line is a curved line in the three-dimensional space depicted in FIG. 5. The modifying unit 130 may decide the point, namely the noise level and exposure, of the intersecting line where the recognition rate is highest as a parameter for the imaging device 210, for example.

Furthermore, the modifying unit 130 may, in addition, acquire illuminance information indicating an illuminance that is a detection result according to the illuminance detection unit 240, and perform at least one of (i) modifying the shutter speed to a value that becomes smaller, and (ii) modifying the sensitivity to a value that becomes larger, as the illuminance indicated by the acquired illuminance information becomes smaller. Specifically, the modifying unit 130 may modify a parameter including at least one of the shutter speed and the sensitivity, using the relationship between the illuminance and the parameter of the imaging device 210, determined in advance.

Returning to FIG. 3, the control unit 140 causes the imaging device 210 to perform imaging using the parameter modified by the modifying unit 130, at a timing at which the vehicle 200 actually passes the future travel location of the vehicle 200 estimated by the first location estimation unit 110. The control unit 140 is realized by the CPU 101, the main memory 102, the storage 103, and the communication IF 104, for example.

1-2. OPERATION

Next, an operation of the imaging control device 100 will be described.

Figure 6:
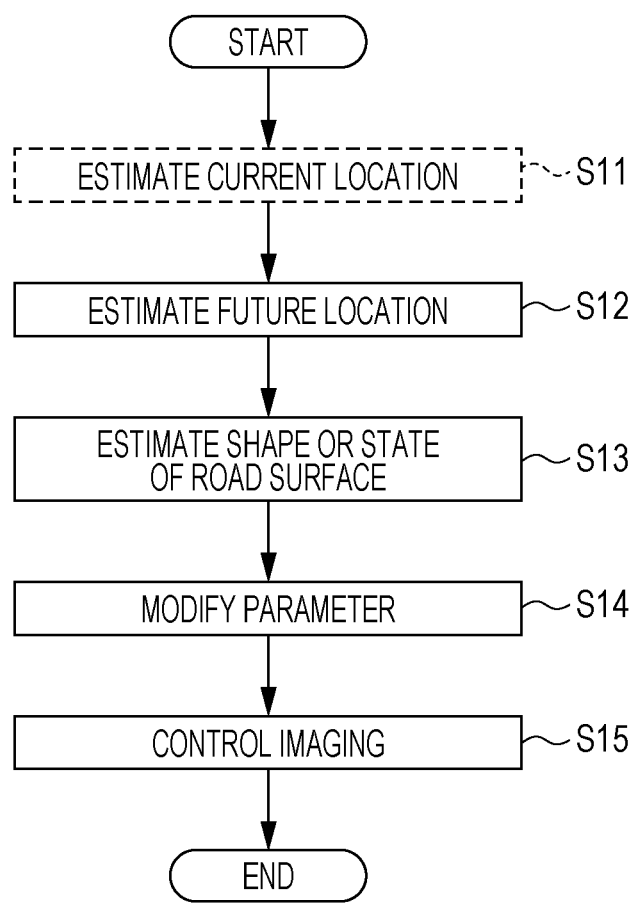
FIG. 6 is a flowchart depicting an example of an imaging control method implemented by the imaging control device according to the embodiment.
Figure 7:
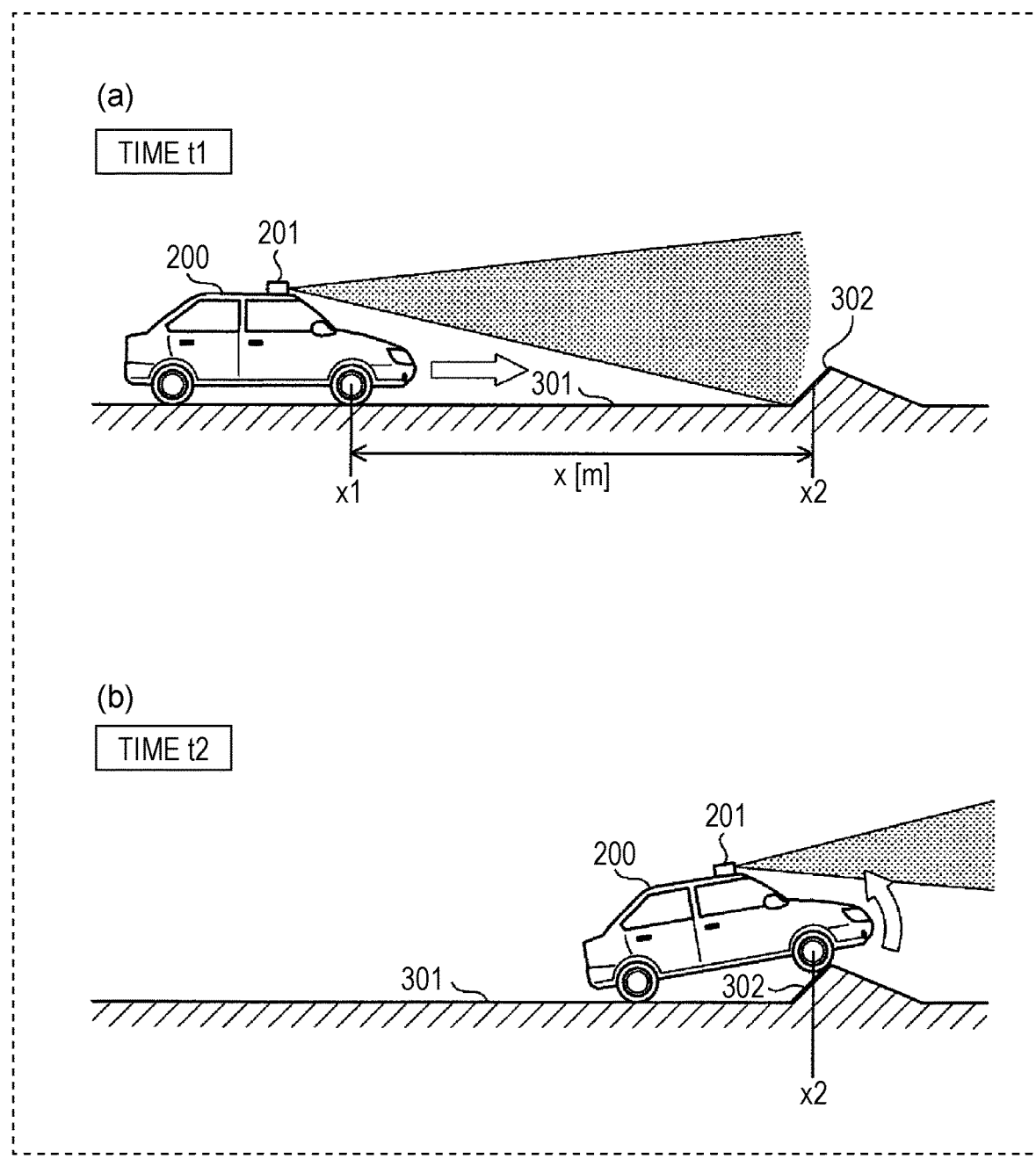
FIG. 7 is a drawing for describing the imaging control method implemented by the imaging control device.

FIG. 6 is a flowchart depicting an example of an imaging control method implemented by the imaging control device according to the embodiment. FIG. 7 is a drawing for describing the imaging control method implemented by the imaging control device.

In the imaging control device 100, the second location estimation unit 150 estimates the current location of the vehicle 200 (S11). For example, the second location estimation unit 150 estimates a location x1 of the vehicle 200 at time t1, as depicted in FIG. 7(a). The imaging control device 100 may estimate the location of the front wheels of the vehicle 200 as the current location of the vehicle 200. It should be noted that the estimation of the current location of the vehicle 200 by the second location estimation unit 150 may not be performed.

The first location estimation unit 110 acquires the velocity vector or route data of the vehicle 200, and the current location of the vehicle 200, and estimates a future travel location of the vehicle 200 using the acquired velocity vector or route data (S12). For example, the first location estimation unit 110 estimates a location x2 on a road surface 301 that is x[m] in front from the location x1 of the front wheels of the vehicle 200, as the future travel location, as depicted in FIG. 7(a). It should be noted that, in a case where the estimation of the current location of the vehicle 200 is not performed, or in a case where the imaging control device 100 is not provided with the second location estimation unit 150, the first location estimation unit 110 estimates the future travel location of the vehicle 200 without using the current location.

The road surface estimation unit 120 acquires road surface information detected by the distance sensor 201 arranged in the vehicle 200, or an image captured by the imaging device 210, and estimates the shape of the road surface or the state of the road surface at the future travel location estimated by the first location estimation unit 110, using the acquired road surface information or image (S13). The road surface estimation unit 120 estimates the shape of a road surface 302 at the location x2, for example, the rate of change in the height of the road surface 302 in the advancing direction of the vehicle 200. For example, in a case where the height changes by 100 mm for each forward advancement by 100 mm, the road surface estimation unit 120 estimates a shape having a shape change rate of 100%.

The modifying unit 130 modifies a parameter of the imaging device 210, which is at least one of the shutter speed of the imaging device 210 and the sensitivity of the imaging device 210, in accordance with the rate of change in the height of the road surface or the state of the road surface in the advancing direction of the vehicle 200 estimated by the road surface estimation unit 120 (S14). It is sufficient as long as the modifying unit 130 decides the parameter for the period until the vehicle 200 reaches the location x2, namely until time t2.

The control unit 140 causes the imaging device 210 to perform imaging using the parameter modified by the modifying unit 130, at a timing at which the vehicle 200 actually passes the future travel location of the vehicle 200 estimated by the first location estimation unit 110 (S15). The control unit 140 causes the imaging device 210 to perform imaging using the modified parameter at time t2, which is a timing at which the front wheels of the vehicle 200 actually pass the estimated future travel location x2 of the vehicle 200, as depicted in FIG. 7(b).

The imaging control method depicted in FIG. 6 is repeatedly performed at a predetermined cycle while the vehicle 200 is being driven. It should be noted that the predetermined cycle of the imaging control method may be the same as or different from the imaging cycle. Thus, in a case where the rate of change in the height of the road surface or the state of the road surface in the advancing direction of the vehicle 200 has changed, the imaging device 210 can be made to perform imaging using an appropriate parameter that corresponds to the rate of change in the height of the road surface or the state of the road surface. Therefore, the imaging device 210 can be made to capture images in which the recognition rate of a predetermined recognition algorithm is as high as possible.

1-3. EFFECTS ETC.

According to the imaging control device 100 as in the present embodiment, the imaging device 210 can be made to perform imaging using a parameter that has been modified according to the shape or state of a road surface estimated in advance, at a timing at which the vehicle 200 passes the road surface at a future travel location. That is, the imaging device 210 can be made to perform imaging using a parameter that has been appropriately set according to the shape or state of the road surface, and therefore the imaging device 210 can be made to capture images in which object recognition is easy.

Furthermore, according to the imaging control device 100, the current location of the vehicle 200 is estimated, and the future travel location of the vehicle 200 is estimated additionally using the current location, and therefore the future travel location can be accurately estimated.

Furthermore, according to the imaging control device 100, the modifying unit 130 may estimate the magnitude of the velocity at which the imaging device is moving in a direction parallel with the imaging surface of the imaging device, at a timing at which the vehicle actually passes the future travel location, from the rate of change in the height of the road surface in the advancing direction of the vehicle 200 estimated by the road surface estimation unit 120 and the velocity vector. The modifying unit 130 performs at least one of modifying the shutter speed to a value that becomes smaller, and modifying the sensitivity to a value that becomes larger, as the estimated magnitude of the velocity at which the imaging device 210 is moving in the parallel direction becomes larger. It is thereby possible to reduce blurring, distortion, or the like occurring in an image obtained by the imaging device 210.

Furthermore, according to the imaging control device 100, the shutter speed is decided according to the estimated velocity, a noise level and exposure are specified with which the recognition rate in a case where an object is recognized using a predetermined recognition algorithm from an image obtained by the imaging device 210 performing imaging at the decided shutter speed is greater than a predetermined value, and parameters of the imaging device 210 are modified to the decided shutter speed and a sensitivity that corresponds to the specified exposure. Therefore, the imaging device 210 can be made to perform imaging using parameters with which there is an improvement in the recognition rates of objects appearing in images. The imaging device 210 can thereby be made to capture images in which object recognition is easy.

For example, in a case where the driving control device 300, during driving, recognizes an object included in an image captured by the imaging device 210, by means of a predetermined recognition algorithm and thereby detects this object, the recognition rate for the object can be increased compared to a predetermined value regardless of the shape of the travel road surface. The object is an obstacle, a road surface, or the like included in the image, for example.

Furthermore, according to the imaging control device 100, illuminance information indicating an illuminance that is a detection result according to the illuminance detection unit 240 is acquired, and at least one of (i) modifying the shutter speed to a value that becomes smaller, and (ii) modifying the sensitivity to a value that becomes larger, as the illuminance indicated by the acquired illuminance information becomes smaller, is performed. The imaging device 210 can therefore be made to perform imaging using an appropriate parameter in accordance with the illuminance.

In the present embodiment, all directions in 360 degrees in the horizontal direction of the vehicle 200 are described as a specific example of a detection range in the horizontal direction of the distance sensor 201; however, it should be noted that there is no restriction thereto. For example, in a case where the vehicle 200 is moving forward, a range including the region in front of the vehicle 200 may serve as the detection range in the horizontal direction of the distance sensor 201. Furthermore, for example, in a case where the vehicle 200 is moving backward, a range including the region to the rear of the vehicle 200 may serve as the detection range in the horizontal direction of the distance sensor 201.

Furthermore, all directions in 360 degrees in the horizontal direction of the vehicle 200 were taken as an imaging range in the horizontal direction of the imaging device 210; however, there is no restriction thereto. For example, in a case where the vehicle 200 is moving forward, a range including the region in front of the vehicle 200 may serve as the imaging range in the horizontal direction of the distance sensor 201. Furthermore, for example, in a case where the vehicle 200 is moving backward, a range including the region to the rear of the vehicle 200 may serve as the imaging range in the horizontal direction of the distance sensor 201.

1-4. MODIFIED EXAMPLES 1-4-1. Modified Example 1

Next, modified example 1 will be described using FIGS. 8 and 9.

Figure 8:
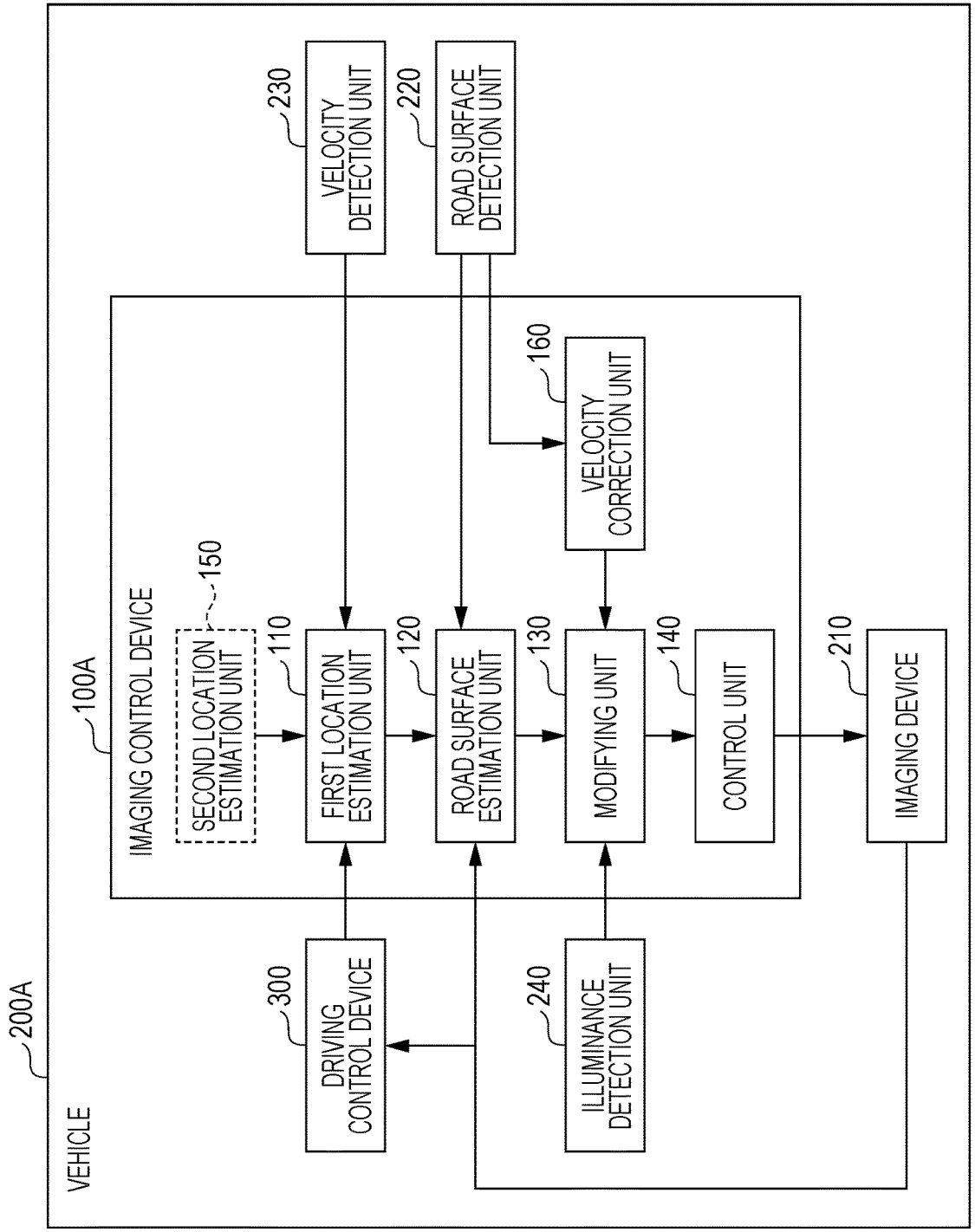
FIG. 8 is a block diagram depicting an example of a functional configuration of a vehicle provided with an imaging control device according to modified example 1.
Figure 9:
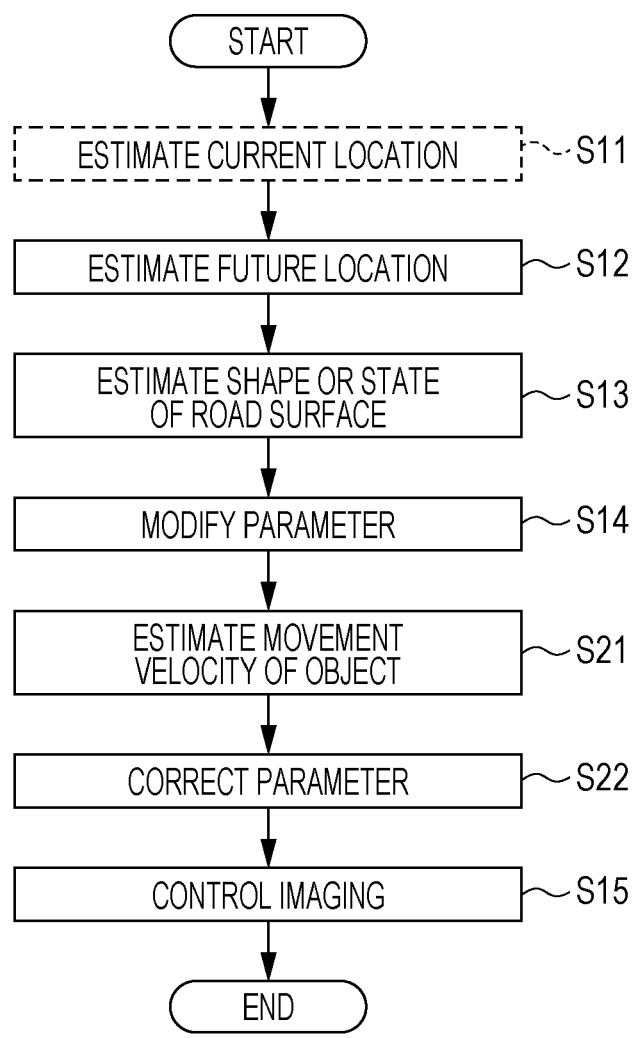
FIG. 9 is a flowchart depicting an example of an imaging control method implemented by the imaging control device according to modified example 1.

FIG. 8 is a block diagram depicting an example of a functional configuration of a vehicle provided with an imaging control device according to modified example 1. FIG. 9 is a flowchart depicting an example of an imaging control method implemented by the imaging control device according to modified example 1.

An imaging control device 100A according to modified example 1 is different compared to the imaging control device 100 according to the embodiment in being further provided with a velocity correction unit 160. The configuration of the imaging control device 100A other than the velocity correction unit 160 is similar to that of the imaging control device 100 of the embodiment, and therefore a description thereof is omitted. Furthermore, the hardware configuration of the imaging control device 100A is similar to the hardware configuration of the imaging control device 100 of the embodiment described in FIG. 2. For example, each block of the imaging control device 100A depicted in FIG. 8 functions due to the CPU 101 described in FIG. 2 executing a control program. It should be noted that a vehicle 200A is different from the vehicle 200 of the embodiment in being provided with the imaging control device 100A.

The velocity correction unit 160 estimates the movement velocity of an object between a plurality of images obtained by the imaging device 210 performing imaging a plurality of times, and causes the modifying unit 130 to perform at least one of (i) modifying the shutter speed to a value that becomes smaller, and (ii) modifying the sensitivity to a value that becomes larger, as the estimated movement velocity becomes larger. Specifically, the velocity correction unit 160 may estimate the distance to an object from the imaging device 210, and the magnitude of the movement velocity in a direction that is substantially orthogonal to the optical axis of the imaging device 210, in the imaging range of the imaging device 210, from a detection result of the distance sensor 201 serving as the road surface detection unit 220, and may estimate the movement velocity of the object between a plurality of images obtained by the imaging device 210 performing imaging a plurality of times, using the estimated distance and movement velocity. It should be noted that, in this case, the distance sensor used to detect the object may be a distance sensor that is provided separately from the distance sensor 201. Furthermore, the velocity correction unit 160 may estimate the movement velocity by acquiring a plurality of images obtained by the imaging device 210 performing imaging a plurality of times and specifying an object picked up in the plurality of acquired images.

The movement velocity will be described in a specific manner using FIG. 10.

Figure 10:
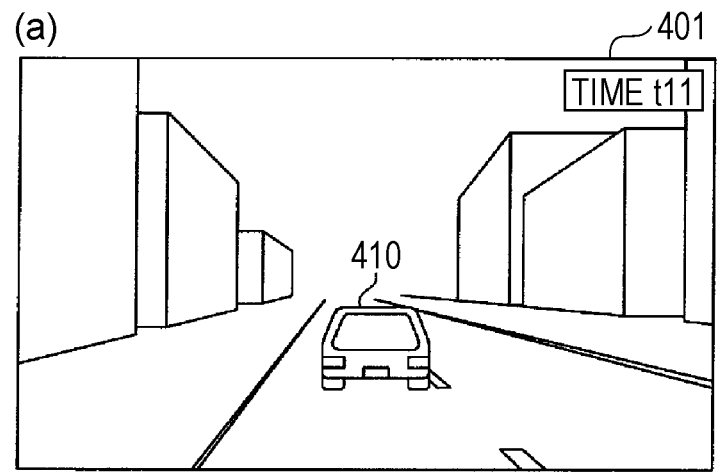
FIG. 10 is a drawing for describing the movement velocity of an object between a plurality of images of the object.
Figure 10:
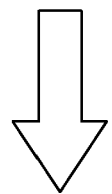
Figure 10:
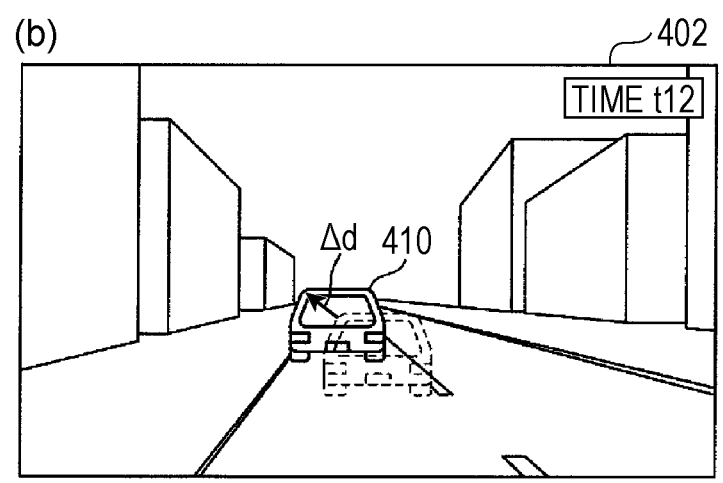

FIG. 10 is a drawing for describing the movement velocity of an object between a plurality of images of the object. It should be noted that FIG. 10(a) depicts an image 401 in which another vehicle 410 that is traveling in front has been captured at time t11, and FIG. 10(b) depicts an image 402 in which the vehicle 410 has been captured at time t12, which is subsequent to time t11. FIGS. 10(a) and (b) each depict an image of the region in front of the vehicle 200.

As depicted in FIG. 10, the vehicle 410 has moved in the image by a distance Δd in the direction of the arrow, between the image 401 captured at time t11 and the image 402 captured at time t12. The movement velocity can therefore be calculated by Δd/(t12−t11). In FIG. 10, the movement velocity is described using images 401 and 402 which have been actually captured; however, it should be noted that the movement velocity may be estimated from a result detected by the distance sensor even if the images 401 and 402 have not been captured.

The velocity correction unit 160 may correct a parameter including at least one of the shutter speed and the sensitivity, using the relationship between the movement velocity of an object and the parameter of the imaging device 210, determined in advance. That is, the velocity correction unit 160 may perform a correction that corresponds to the estimated movement velocity of an object, with respect to the parameter decided by the modifying unit 130.

The velocity correction unit 160 is realized by the CPU 101, the main memory 102, the storage 103, and the communication IF 104, for example.

The modifying unit 130 corrects the parameter of the imaging device 210 to at least one of the shutter speed and the sensitivity modified by the velocity correction unit 160.

Next, an operation (imaging control method) of the imaging control device 100A of modified example 1 will be described.

In the imaging control device 100A, there is a difference compared to the imaging control method of the embodiment in that steps S21 and S22 have been additionally added. Steps S21 and S22 will therefore be described.

In the imaging control device 100A, after step S14, the velocity correction unit 160 estimates the movement velocity of an object in the imaging range of the imaging device 210 (S21).

The velocity correction unit 160 performs a correction that corresponds to the estimated movement velocity with respect to the parameter modified by the modifying unit 130, and causes the modifying unit 130 to additionally modify the parameter to the corrected parameter (S22).

Step S15 is performed once step S22 has finished.

According to the imaging control device 100 as in modified example 1, the velocity correction unit 160 estimates the movement velocity of an object between a plurality of images obtained by the imaging device 210 performing imaging a plurality of times. The velocity correction unit 160 causes the modifying unit 130 to perform at least one of (i) modifying the shutter speed to a value that becomes smaller, and (ii) modifying the sensitivity to a value that becomes larger, as the magnitude of the estimated movement velocity becomes larger. Therefore, the imaging device 210 can be made to capture an object using an appropriate parameter, even in a case where the object is moving in images obtained by the imaging device 210, and even in a case where the object is moving within the imaging range of the imaging device 210.

1-4-2. Modified Example 2

Next, modified example 2 will be described using FIGS. 11 and 12.

Figure 11:
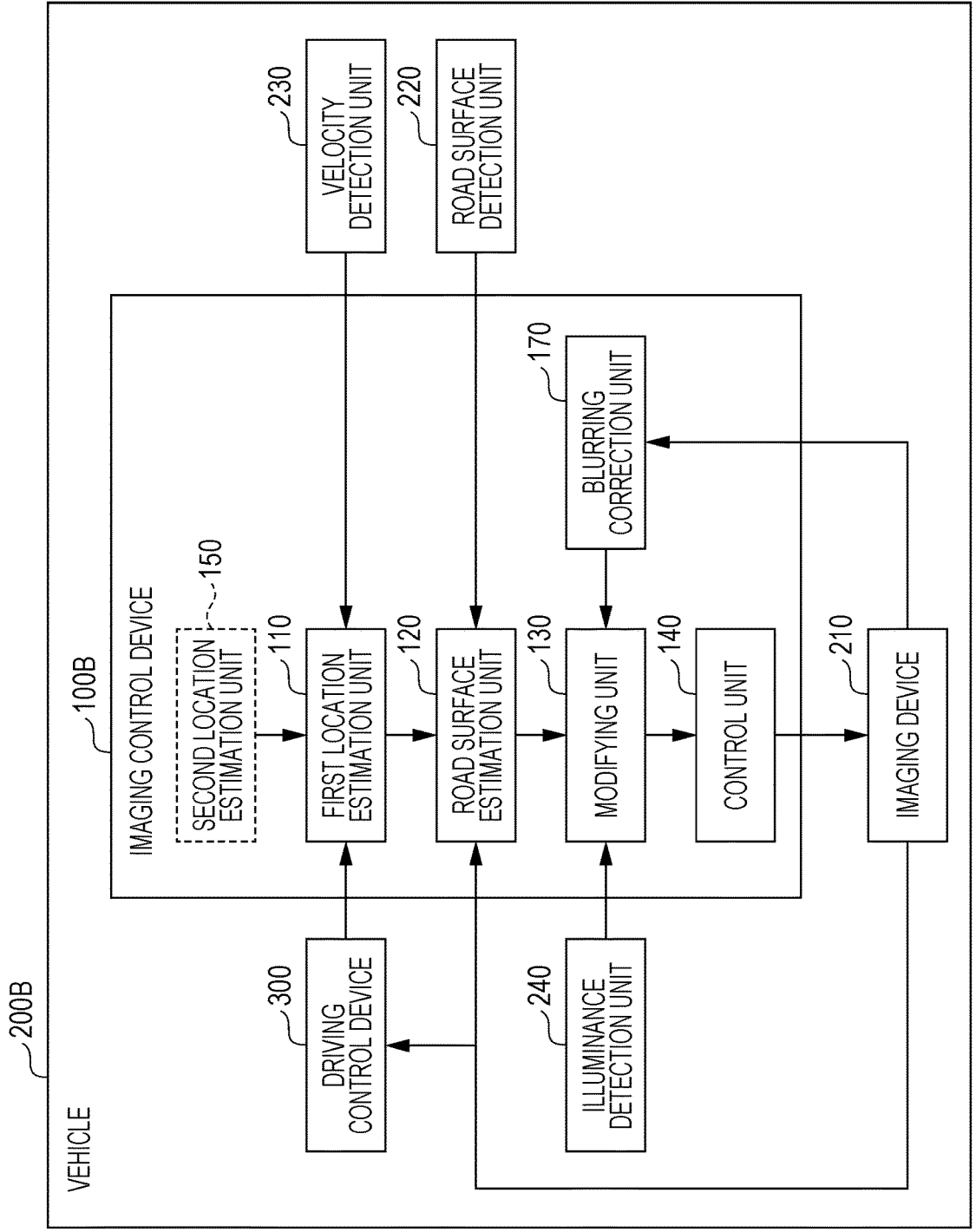
FIG. 11 is a block diagram depicting an example of a functional configuration of a vehicle provided with an imaging control device according to modified example 2.
Figure 12:
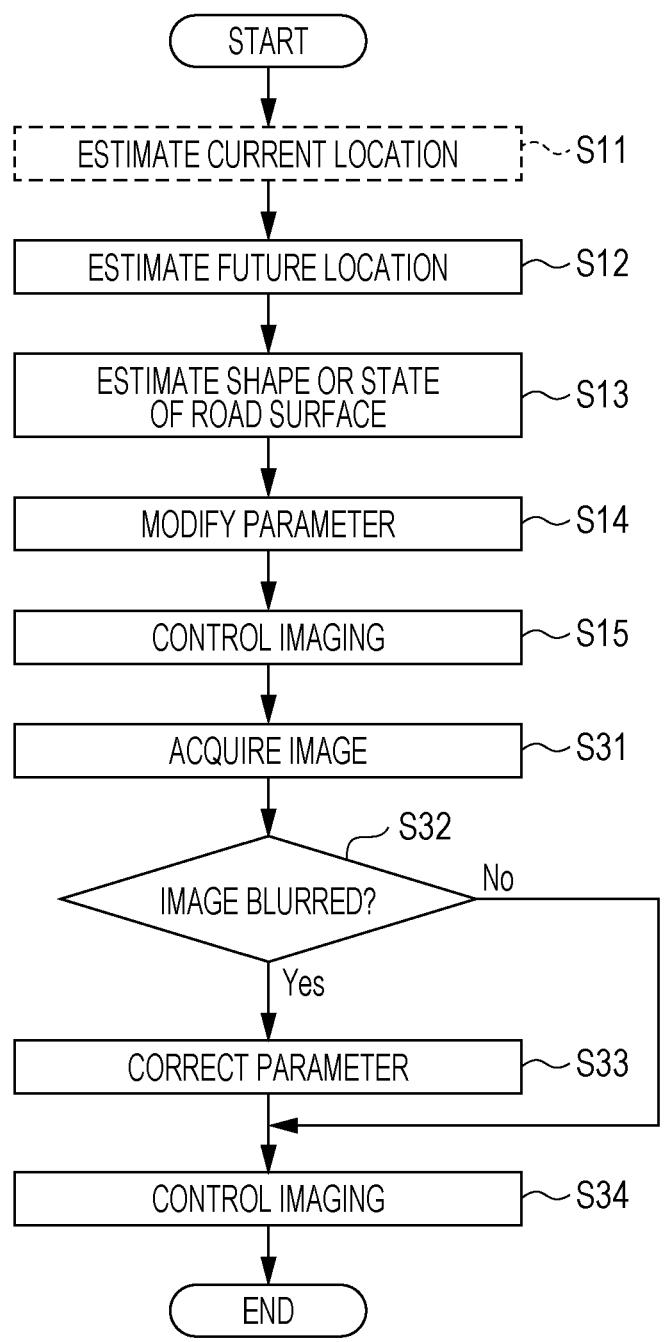
FIG. 12 is a flowchart depicting an example of an imaging control method implemented by the imaging control device according to modified example 2.

FIG. 11 is a block diagram depicting an example of a functional configuration of a vehicle provided with an imaging control device according to modified example 2. FIG. 12 is a flowchart depicting an example of an imaging control method implemented by the imaging control device according to modified example 2.

An imaging control device 100B according to modified example 2 is different compared to the imaging control device 100 according to the embodiment in being further provided with a blurring correction unit 170. The configuration of the imaging control device 100B other than the blurring correction unit 170 is similar to that of the imaging control device 100 of the embodiment, and therefore a description thereof is omitted. Furthermore, the hardware configuration of the imaging control device 100B is similar to that of the imaging control device 100 of the embodiment described in FIG. 2. For example, each block of the imaging control device 100B depicted in FIG. 11 functions due to the CPU 101 described in FIG. 2 executing a control program. It should be noted that a vehicle 200B is different from the vehicle 200 of the embodiment in being provided with the imaging control device 1006.

The blurring correction unit 170 acquires an image captured by the imaging device 210, detects blurring of an object within the image acquired, and, in a case where blurring of the object within the image is detected, causes the modifying unit 130 to perform at least one of (i) modifying the shutter speed to a smaller value, and (ii) modifying the sensitivity to a larger value. Specifically, the blurring correction unit 170 may calculate the sum of contrast values for the entire image acquired from the imaging device 210, and may determine that blurring has occurred within the image in a case where the calculated sum is less than a predetermined threshold value. That is, the blurring correction unit 170 detects blurring of an object within the image when having determined that blurring has occurred within the image, and does not detect blurring of an object within the image when having determined that blurring of an object within the image has not occurred. It has been assumed that the blurring correction unit 170 determines whether blurring has occurred in an image with respect to the entire image; however, it should be noted that the blurring correction unit 170 may perform predetermined image processing to thereby specify the region in the acquired image in which a vehicle traveling in front, for example, appears as an object, and determine whether blurring has occurred in the specified region. The blurring correction unit 170 performs a specific correction in order to correct the blurring of the object within the image, with respect to the parameter modified by the modifying unit 130.

The blurring correction unit 170 is realized by the CPU 101, the main memory 102, the storage 103, and the communication IF 104, for example.

The modifying unit 130 corrects the parameter of the imaging device 210 to at least one of the shutter speed and the sensitivity modified by the blurring correction unit 170.

Next, an operation (imaging control method) of the imaging control device 100B of modified example 2 will be described.

In the imaging control device 100B, there is a difference compared to the imaging control method of the embodiment in that steps S31 to S34 have been additionally added. Steps S31 to S34 will therefore be described.

In the imaging control device 1006, after step S15, the blurring correction unit 170 acquires an image captured by the imaging device 210 (S31).

The blurring correction unit 170 determines whether or not there is blurring in the acquired image (S32).

The blurring correction unit 170, when having determined that there is blurring in the acquired image ("yes" in step S32), in order to correct the detected blurring, performs a specific correction with respect to the parameter modified by the modifying unit 130, and causes the modifying unit 130 to additionally modify the parameter to the corrected parameter (S33).

The control unit 140 causes the imaging device 210 to perform imaging using the parameter modified by the modifying unit 130, at a timing at which the vehicle 200B passes the future travel location estimated by the first location estimation unit 110 (S34).

However, in a case where the blurring correction unit 170 has determined that there is no blurring in the acquired image ("no" in step S32), the next step S34 is performed without a correction being implemented.

According to the imaging control device 100B as in modified example 2, the blurring correction unit 170 acquires an image captured by the imaging device 210, detects blurring of an object within the image acquired, and, when having detected blurring of an object within the image, causes the modifying unit 130 to perform at least one of (i) modifying the shutter speed to a small value, and (ii) modifying the sensitivity to a large value. Therefore, the imaging device 210 can be made to perform imaging using a parameter that has been modified in such a way that blurring does not occur when imaging is next performed, even in a case where blurring has occurred within an image captured using the parameter modified by the modifying unit 130.

It should be noted that the blurring correction unit 170 may perform the blurring correction processing (steps S31 to S34) only in a case where a detection result according to the illuminance detection unit 240 cannot be acquired.

It should be noted that an imaging control device having a configuration obtained by combining modified example 1 and modified example 2 may be implemented.

It should be noted that, in the aforementioned embodiment and the modified examples thereof, the constituent elements may be configured by using dedicated hardware, or may be realized by executing a software program suitable for the constituent elements. The constituent elements may be realized by a program execution unit such as a CPU or a processor reading out and executing a software program recorded in a recording medium such as a hard disk or a semiconductor memory. Here, software that realizes an imaging control method and the like of the aforementioned embodiments is a program such as the following.

In other words, this program causes a computer to execute an imaging control method performed by an imaging control device that causes an imaging device arranged in a vehicle to capture the periphery of the vehicle, the imaging control method including: acquiring a velocity vector indicating the advancing direction of the vehicle and the speed of the vehicle traveling in the advancing direction or route data indicating a route to be traveled by the vehicle, and estimating a future travel location of the vehicle using the velocity vector or the route data acquired; acquiring road surface information for estimating the shape of a road surface or the state of the road surface including the estimated future travel location of the vehicle detected by a sensor arranged in the vehicle, or an image including the road surface at the estimated future travel location of the vehicle captured by the imaging device, and estimating the rate of change in the height of the road surface in the advancing direction or the state of the road surface at the estimated future travel location of the vehicle, using the road surface information or the image acquired; modifying a parameter of the imaging device which is at least one of the shutter speed of the imaging device and the sensitivity of the imaging device, according to the rate of change in the height of the road surface in the advancing direction or the state of the road surface estimated; and causing the imaging device to perform imaging using the modified parameter, at a timing at which the vehicle passes the estimated future travel location of the vehicle.

As described above, an imaging control device and an imaging control method according to one or more aspects of the present disclosure have been described on the basis of an embodiment; however, the present disclosure is not restricted to this embodiment. Modes in which various modifications conceived by a person skilled in the art have been implemented in the present embodiment, and modes constructed by combining the constituent elements in different embodiments may also be included within the scope of the one or more aspects of the present disclosure provided they do not depart from the gist of the present disclosure.

The present disclosure is useful as an imaging control device or the like with which an imaging device can be made to capture images in which object recognition is easy.

What is claimed is:

1. An imaging control device that causes an imaging device arranged in a vehicle to capture a periphery of the vehicle, the imaging control device comprising:
   an accelerator sensor that
      acquires a velocity vector or route data, the velocity vector indicating an advancing direction of the vehicle and a speed of the vehicle traveling in the advancing direction, and the route data indicating a route to be traveled by the vehicle, and
      estimates a future travel location of the vehicle using the velocity vector or the route data acquired;
   a road surface processor that acquires distance information and estimates, using the distance information, a rate of change in a height of the road surface in the advancing direction at the future travel location of the vehicle estimated by the accelerator sensor,
   the distance information including:
      road surface information for estimating a shape of a road surface or a state of the road surface including the estimated future travel location of the vehicle detected by a sensor arranged in the vehicle, or
      an image including the road surface at the estimated future travel location of the vehicle captured by the imaging device;
   a modifying processor that modifies a parameter of the imaging device according to the rate of change in the height of the road surface in the advancing direction estimated by the road surface processor, the parameter being at least one of a shutter speed of the imaging device and a sensitivity of the imaging device; and a controller that causes the imaging device to perform imaging using the parameter modified by the modifying processor, at a timing at which the vehicle passes the future travel location of the vehicle estimated by the accelerator sensor.

2. The imaging control device according to claim 1, further comprising a global navigation satellite system (GNSS) processor that estimates a current location of the vehicle,
the accelerator sensor estimating the future travel location of the vehicle additionally using the current location of the vehicle estimated by the GNSS processor.

3. The imaging control device according to claim 1, wherein the accelerator sensor acquires the velocity vector, and
the modifying processor
estimates a magnitude of a velocity at which the imaging device is moving in a direction parallel with an imaging surface of the imaging device at the timing, from the rate of change in the height of the road surface in the advancing direction estimated by the road surface processor, and the velocity vector, and
performs at least one of (i) modifying the shutter speed to a value that becomes smaller, and (ii) modifying the sensitivity to a value that becomes larger, as the estimated magnitude of the velocity in the parallel direction becomes larger.

4. The imaging control device according to claim 3, wherein the modifying processor
decides the shutter speed in accordance with the estimated magnitude of the velocity in the parallel direction,
specifies a noise level and exposure with which a recognition rate in a case where an object is recognized using a predetermined recognition algorithm from an image obtained by the imaging device performing imaging at the decided shutter speed is greater than a predetermined value, and
modifies the parameter of the imaging device to the decided shutter speed and a sensitivity that corresponds to the specified exposure.

5. The imaging control device according to claim 1, further comprising a blurring correcting processor that acquires the image captured by the imaging device, detects blurring of an object within the image acquired, and, in a case where blurring of the object within the image is detected, causes the modifying processor to perform at least one of (i) modifying the shutter speed to a smaller value, and (ii) modifying the sensitivity to a larger value.

6. The imaging control device according to claim 1, further comprising a velocity correcting processor that estimates a movement velocity of an object, based on a change in a location of the object, which is included in each of a plurality of images obtained by the imaging device performing imaging a plurality of times, and causes the modifying processor to perform at least one of (i) modifying the shutter speed to a value that becomes smaller, and (ii) modifying the sensitivity to a value that becomes larger, as a magnitude of the estimated movement velocity becomes larger.

7. The imaging control device according to claim 1, wherein the modifying processor acquires illuminance information indicating an illuminance that is a detection result according to an illuminance sensor that detects an illuminance of an environment in which the imaging device is arranged, and performs at least one of (i) modifying the shutter speed to a value that becomes smaller, and (ii) modifying the sensitivity to a value that becomes larger, as the illuminance indicated by the acquired illuminance information becomes smaller.

8. The imaging control device according to claim 1, wherein the road surface processor estimates the rate of change in the height of the road surface in the advancing direction at the future travel location of the vehicle estimated by the accelerator sensor, and
the modifying processor modifies the parameter of the imaging device in accordance with the rate of change in the height of the road surface in the advancing direction at the estimated future travel location of the vehicle.

9. An imaging control method performed by an imaging control device that causes an imaging device arranged in a vehicle to capture a periphery of the vehicle, the imaging control method including:
acquiring a velocity vector or route data, by an accelerator sensor, the velocity vector indicating an advancing direction of the vehicle and a speed of the vehicle traveling in the advancing direction, and the route data indicating a route to be traveled by the vehicle, and
estimating, by the accelerator sensor, a future travel location of the vehicle using the velocity vector or the route data acquired;
acquiring, by a road surface processor, distance information, the distance information including:
road surface information for estimating a shape of a road surface or a state of the road surface including the estimated future travel location of the vehicle detected by a sensor arranged in the vehicle, or
an image including the road surface at the estimated future travel location of the vehicle captured by the imaging device, and
estimating, by the road surface processor and using the distance information, a rate of change in a height of the road surface in the advancing direction at the estimated future travel location of the vehicle;
modifying, by a modifying processor, a parameter of the imaging device which is at least one of a shutter speed of the imaging device and a sensitivity of the imaging device, according to the rate of change in the height of the road surface in the advancing direction estimated; and
causing the imaging device to perform imaging using the modified parameter, at a timing at which the vehicle passes the estimated future travel location of the vehicle.

* * * * *